Patented Aug. 27, 1929.

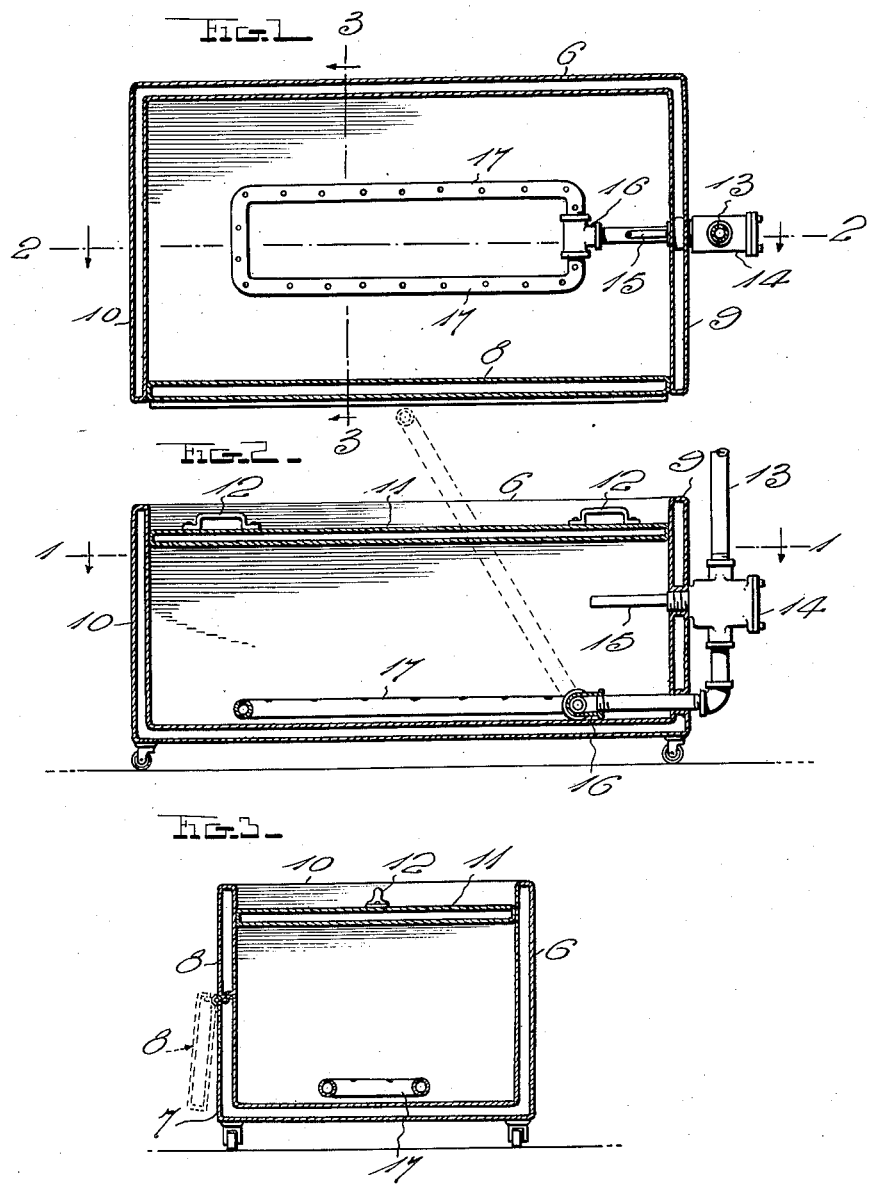

1,725,969

UNITED STATES PATENT OFFICE.

HERAND ROBINSON, OF WELLINGTON, OHIO, ASSIGNOR TO THE PIERCY COMPANY, OF WELLINGTON, OHIO, A CORPORATION OF DELAWARE.

METHOD OF CONVERTING FOODSTUFFS FOR CATTLE.

Application filed June 22, 1927, Serial No. 200,745. Renewed December 28, 1928.

The novelty of this invention relates primarily to the transformation or conversion into more readily digestible substances, of those types of food stuffs which are customarily considered waste in agriculture. Many materials which must be rejected for purposes of feeding live stock are unsatisfactory because live stock are unable to assimilate the nutritive values present or in forms not available by digestion. Such material is for example those green stuffs such as corn stalks, legumes, hay and other fibrous fodder material which contain valuable quantities of starches, proteins and the like but so closely held in complex structures as to be unaffected in the ordinary processes of digestion.

To a certain extent the normal processes of digestion by live stock will break down the complex carbohydrates and proteins into their simpler forms of valuable food materials, but this procedure is an incomplete one in that large percentage of nutriments present in the feed pass through the system of the animal unused and in many instances places an undue burden on the animal's digestive organs. It is a purpose of this invention to react upon such food-containing materials by a predigestion analogous to that which is carried out by the animal and to produce a food material which is digestible by the animal with the least burden and to the greatest possible extent.

It is a further object of this invention to take advantage of the selective properties of certain enzymotic substances whereby the food materials have their starches hydrolized or otherwise transformed, their proteins simplified and the fats split.

It is a further object of my invention to react upon the raw materials for the above purposes in such a short space of time that the end-products in case of transformation of complex carbohydrates with their simpler forms are not in turn decomposed as a result of fermentation.

A further object of the invention is the accomplishment of the above results by means of certain specific enzymotic substances which acting as a group, will be capable of carrying out the above reactions under favorable conditions and without extending the reactions beyond the above indicated products. These substances are those which are extracted from the digestive organs of animals and are found to contain pancreatic amylases, lactase, maltase, sucrase, and pancreatic lipase and peptase. It is desirable that several of the above be present in order that the reaction shall be continued at least for the ultimate pre-digestion of the complex carbohydrates and proteins.

It has been found that enzymotic substances can be adapted to the conversion of rough fodder materials and thus simplify the food materials, but in general it has also been found that where such conversion is attempted, due to the character of the reacting substances, or the material upon which they act, the conversion can not be readily controlled but on the contrary the desired results will be necessarily accompanied by the production of other undesirable fermentative results. By way of example it may be pointed out that the usual treatment of starch containing food stuffs with a substance such as malt diastase has but a limited effect if any upon the true starches present and what transformations are produced in the sugars are necessarily accompanied by fermentation. As a distinction from the above, this process uses enzymotic substances preferably of animal origin, the action of which can be sufficiently accelerated to completely transform the starch and partly also the proteins and fats before any material fermentation or oxidation of the resulting sugars will ensue. In this way the product obtained is analogous to that formed in the preliminary steps of normal digestion of herbivorous live stock.

By way of example animal diastases, and digestive enzymes which are the by-products of the meat packing industry, are used to react upon the starch-containing vegetable matter under favorable conditions and without allowing other reactions to ensue in any undesirable extent. It is found that the above enzymotic substances are most efficient when applied in liquid form and in the presence of free alkalis. It is further a matter of observation, that reactions with amylolitic enzymes are promoted in the presence of Cl, Br, or $NO_3$ ions; that pancreatic enzymes are actuated by soluble calcium salts therefore, ingredients composed of such elements may be used to stimulate chemical activity in the process of said transformation.

For the purpose of primarily rendering the food stuffs more palatable, it is suggested that malt and anise be used in the reaction, as the former makes the materials agreeable to the taste and the latter has well recognized properties in the control of gases which may result from the process of digestion; however other ingredients with similar properties may be used for developing an appetizing odor and flavor.

It is desired to point out that this process of carbo-hydrate digestion is exactly comparable with the action of saliva and to a certain extent to that of the amylopsin of the pancreatic juice as carried on in the digestive organs of the animal. Ptyalin and amylopsin carry the starch digestion no further than the maltose and dextrose stage and similarly the end products obtained in this reaction are practically identical with those resulting from the diastatic enzymes normally present in the animal system. Due to the fact that the enzymotic substances used to carry on the reaction are of animal origin, this action will be a true predigestion similar to that which the live stock would be normally called upon to accomplish. In like manner these substances when so used will not bring into reaction any undesirable amount of further decomposition such as is characteristic in the use of the so-called ferments such as yeast, and enzymes of fermentative properties.

It will be evident that these reactions will most satisfactorily be carried out in the presence of considerable moisture and moderate heat to the degree found most beneficial to the reacting substances present. At the same time where these reactions are primarily hydrolytic, it will be evident that oxygen is not needed to carry them out and in fact may be a decided detriment in encouraging or promoting other undesirable reactions of fermentative character. For this reason the process is best carried out within the limited confines of closed reaction chambers through which the air has been to a considerable degree evacuated in the course of heating the material by moist steam.

As there is always present free alkali, it will be found also that any tendency toward oxidation by fermentation, which would otherwise result in the production of acid products, will be checked and utilized.

By way of illustrating one form of carrying out the above process I have shown in the accompanying drawings a type of installation in which Fig. 1 is a horizontal section taken on line 1—1 in Fig. 2;

Fig. 2 is a vertical longitudinal section on the line 2—2 of Fig. 1 and

Fig. 3 is a vertical transverse section on the line 3—3 of Fig. 1.

A vat or tank 6 is shown having a suitable insulated bottom and walls. The front wall 7 of the vat is divided longitudinally to provide a hinged section 8 having a close fit with the upper edge of the wall 7 and the end walls 9 and 10. A suitable cover 11 is provided for close fit with the side walls and front partition 8. This cover 11 while indicated as vertically movable by means of handles 12, 12, may also be constructed as hinged from one side wall of the vat or other analogous means of movement may be provided. There is thus provided a water-proof vat adequately insulated against the loss of the contained heat and protecting the material within the vat from the access of atmospheric air without however preventing the escape of excess steam or gases produced in the reaction. The front partition is of value in the inspection of the material during the operation or in its ready removal when completely prepared.

Suitable means are provided to supply additional heat and moisture under adequate control. As shown, a steam pipe 13 leads into the bottom of the vat. This steam pipe carries a thermometric controlled valve 14 the thermostat of which 15 extends through a fitting and within the area of the vat.

The pipe 13 terminates within the vat and at the bottom thereof in a swivel connection 16 which carries a heating coil 17. This heating coil has a series of apertures by means of which the steam is allowed to escape to heat the mass in the vat. The coil 17 may be tilted up for the purpose of clearing the feed from the vat.

The above equipment is similar to that shown and claimed in the copending application of Linnaeus H. Piercy Serial No. 82,346.

This vat or tank is substantially filled with waste roughage consisting of leaves, stalks and the like which have preferably been freshly harvested and therefore contain considerable moisture. In order to carry on the reaction in a uniform manner it is best to have these materials cut up into particles not exceeding one inch in any dimension. It is also desirable that the various forms of material shall be well mixed either before or after they have been placed in the tank. Sufficient water is added to wet down the material thoroughly and the temperature may be controlled either by the temperature of the water or by the introduction of moist steam through the pipes 13, 17. It is generally understood that to wet down the material thoroughly will require approximately sixty parts by weight of water for every forty parts by weight of the material to be treated. This is not enough to submerge the material or even to soak it since this amount of water will be readily absorbed by the fibrous or vegetable material. This amount of moisture has been found not to interfere with the normal operation of those enzymotic substances, such as amylopsin, which (as is well known) lose their efficiency in the presence of an excess amount of water in a relatively short period of time. The temperature may be maintained by the addition of steam during the reaction and under control preferably by a thermostat 15. It will be evident that the greater part of the air will thus be driven out of the reaction chamber.

The reaction takes place after the introduction and mixing with the material of a converter compound, the preferred approximate proportions of which are as follows: Digestive enzymotic extracts, 8%; alkali (such as sodium bicarbonate), 5%; salts of Cl, Br, or $NO_3$ (such as sodium chloride), 32%; calcium salt (such as calcium carbonate), 36%; malt, 15%; anise or other flavoring, 4%.

This compound may be thoroughly mixed with the roughage in the dry state before the addition of water or may be added to the water prior to the mixture of the latter with the roughage. In either event uniformity of result depends to a considerable extent upon a thorough mixture so that the compound will be brought in contact with all of the roughage.

The materials are allowed to react in the tank for several hours depending upon the concentration of the converter compound, the character of the roughage, and the temperature maintained. Experience has demonstrated that the reaction may be carried out in the space of several hours or may require as many as twelve hours. The completion of the reaction is measured by the fact that the starches have been substantially entirely transformed and that the resulting material no longer gives evidence of the presence of any untransformed starch.

At the same time, as has been pointed out above, the alkaline condition of the medium, the source of the digestive enzymotic substances employed, and the absence of air serve to check any undesirable production of fermentation and to neutralize whatever slight amount of fermentation may incidentally result from the wild ferments that may be introduced on the roughage.

By carrying out the above process in the manner indicated, there results an efficient and substantially complete conversion of the starches of the roughage equivalent to the initial digestive reactions normally carried out by live stock. At the same time the conditions maintained and the materials used, contribute in large degree to the prevention of undesirable side reactions.

What is claimed is:

1. The method of converting vegetable materials into more readily digestible food substances which consists in reacting on the materials in a moist state with a plurality of diverse digestant enzymotic substances acting selectively on the proteid and starchy materials.

2. The method of converting vegetable materials into more readily digestible food substances which consists in reacting on the materials in a moist state and an alkaline medium with a plurality of diverse digestant enzymotic substances acting selectively on the proteid and starchy materials.

3. The method of converting vegetable materials into more readily digestible food substances which consists in reacting on the materials in a moist state and in the presence of inorganic salts accelerating the reaction, with a plurality of diverse digestant enzymotic substances acting selectively on the proteid and starchy materials.

4. The method of converting vegetable materials into more readily digestible food substances which consists in reacting on the materials in a moist state in the presence of an alkali and in presence of Cl, Br, or $NO_3$ ions, with a plurality of diverse digestant enzymotic substances acting selectively on the proteid and starchy materials.

5. The method of converting vegetable materials into more readily digestible food substances which consists in reacting on the materials in a warmed moist state with a plurality of diverse digestant enzymotic substances acting selectively on the proteid and starchy materials under conditions unfavorable to the oxidation of the hydrolized products.

6. The method of converting vegetable materials into more readily digestible food substances which consists in hydrolizing the materials in a moist state and an alkaline medium by the action of a plurality of diverse digestant enzymotic substances acting selectively on the proteid and starchy materials and preventing the further fermentive oxidation of the hydrolized materials.

7. The method of converting vegetable materials into more readily digestible food substances which consists in reacting on the materials in a warmed moist state and an alkaline medium in the presence of soluble calcium salts, sodium chloride, sodium bicarbonate, malt and anise, with enzymotic substances capable of converting the starches present into maltose and dextrose without any substantial quantity of intermediate starch conversion products, and the complex proteins into their simpler forms.

8. The method of converting vegetable materials into more readily digestible food substances which consists in reacting on the materials in a moist state and in an alkaline medium with approximately 8% of a plurality of diverse digestant enzymotic substances acting selectively on the proteid and starchy materials in the presence of sodium bicarbonate 5%, sodium chloride 32%, lime 36%, malt 15% and anise 4%.

In testimony, I have hereunto subscribed my name.

HERAND ROBINSON.